United States Patent [19]

Rossoll et al.

[11] Patent Number: 5,362,579
[45] Date of Patent: Nov. 8, 1994

[54] SOLDER SEALED SOLID ELECTROLYTE CELL HOUSED WITHIN A CERAMIC FRAME AND THE METHOD FOR PRODUCING IT

[75] Inventors: Mary P. Rossoll, Willoughby; Alan J. Revilock, Middleburgh Heights, both of Ohio

[73] Assignee: Gould Electronics Inc., Eastlake, Ohio

[21] Appl. No.: 139,422

[22] Filed: Oct. 20, 1993

Related U.S. Application Data

[62] Division of Ser. No. 982,556, Nov. 27, 1992, Pat. No. 5,279,626.

[51] Int. Cl.$^5$ ............................................. H01M 10/40
[52] U.S. Cl. ...................................... 429/162; 429/192; 429/211
[58] Field of Search ............... 429/162, 163, 178, 211, 429/192, 194, 224

[56] References Cited

U.S. PATENT DOCUMENTS

| | | | |
|---|---|---|---|
| 4,172,319 | 10/1979 | Bloom et al. | 29/623.4 |
| 4,956,247 | 9/1990 | Miyazaki et al. | 429/194 |
| 5,004,657 | 4/1991 | Yoneda et al. | 429/193 |
| 5,041,199 | 8/1991 | DiFranco | 429/218 X |
| 5,085,952 | 2/1992 | North | 429/192 |
| 5,089,027 | 2/1992 | Rossoll et al. | 429/192 |
| 5,114,809 | 5/1992 | Nakacho et al. | 429/192 |
| 5,153,080 | 10/1992 | Jnubushi et al. | 429/192 |
| 5,208,121 | 5/1993 | Yahnke et al. | 429/162 |
| 5,279,910 | 1/1994 | Sasaki et al. | 429/192 X |

*Primary Examiner*—Anthony Skapars
*Attorney, Agent, or Firm*—Michael A. Centanni

[57] ABSTRACT

A solid electrolyte cell and method for producing it in which the cell components are assembled within a ceramic frame which is closed on the top by a first terminal of the cell using a solder seal and closed on the bottom by a second terminal of the cell using a solder seal and said second terminal having the opposite polarity to that of the first terminal.

4 Claims, 3 Drawing Sheets

SOLDER SEALED SOLID ELECTROLYTE CELL HOUSED WITHIN A CERAMIC FRAME AND THE METHOD FOR PRODUCING IT

This application is a division of prior U.S. application Ser. No. 07/982,556, filed Nov. 27, 1992, now U.S. Pat. No. 5,279,626.

FIELD OF THE INVENTION

The invention relates to a method for producing a cell, such as a solid electrolyte cell and the cell so produced, preferably a planar cell housed within a ceramic frame closed at the top surface and bottom surface with conductive terminal sheets using a solder seal. The cell so produced will have high temperature stability and preferably be hermetically sealed.

BACKGROUND OF THE INVENTION

Ionic conductivity is commonly associated with the flow of ions through a liquid solution of salts. In the vast majority of practical uses of ionic conductors, i.e., as electrolytes for dry cell and sealed lead acid batteries, the liquid solution is immobilized in the form of a paste or gelled matrix or is absorbed in a separator to overcome the difficulties associated with handling and packaging a liquid. However, even after immobilization, the system is still subject to possible leakage, has a limited shelf life due to drying out or crystallization of the salts and is suitable for use only within a limited temperature range corresponding to the liquid range of the electrolyte. In addition, the use of a large volume of immobilizing material has hindered the aims of miniaturization and lowers the output capacity.

Improved microelectronic circuit designs have generally decreased the current requirements for each transistor which makes up the electronic devices. This in turn has enhanced the applicability of solid electrolyte power sources which usually can deliver currents only in the microampere range. These solid electrolyte systems have the inherent advantages of being free of electrolyte leakage, corrosion and internal gassing problems due to the absence of a liquid phase. In addition, they also have a much longer shelf life than the conventional liquid electrolyte power sources.

In attempting to avoid the shortcomings of liquid systems, investigators have surveyed a large number of solid compounds seeking to find compounds which are solid at room temperature and have specific conductances approaching those exhibited by the commonly used liquid systems. Solid electrolytes must be essentially electronic insulators so as not to internally short the cell while at the same time they must allow for ionic migration if the cell is to operate properly. There are many solid state electrolytes "disclosed" in the art that can be used for solid state cells but many can only operate efficiently at higher temperatures, have low operating voltages or have internal high resistance.

United Kingdom Patent No. 2,201,287B discloses a solid polymer electrolyte for use in solid electrolyte cells which comprises a complex of a solid polymer and an alkali metal salt, which polymer is capable of forming donor-acceptor type bonds with alkali metal ions and is capable of conducting alkali metal ions and wherein the complex is associated with a mixture of more than one substituted or unsubstituted 1,3-dioxolane-2-ones. The preferred mixture recited is ethylene carbonate and propylene carbonate. This solid electrolyte has been found to produce a good lithium solid state cell that can operate at ambient temperature.

U.S. patent application Ser. No. 07/617,993 discloses a method for producing a solid electrolyte cell using the solid electrolyte disclosed in the U.K Patent No. 2,201,287B referred to above. In particular, an adhesive coated frame is deposited on the peripheral area of current collector sheets and the components of the cell are positioned within the frame of adhesive whereupon the current collector sheets are then secured together at the peripheral area containing the adhesive layer.

Several cell applications require that the cell be directly incorporated into a device to produce a portable finished package. This could require the cell to be encapsulated or molded into the device. In injection molding, for example, the cell must be highly planar in appearance and capable of withstanding high temperature processing up to 200° C. These conditions tend to favor the use of a solid electrolyte cell. The polymeric cell components such as the one referred to above, function well at elevated temperatures.

Flat solid electrolyte cells have been assembled typically with an adhesive coated substrate as a spacer and seal. The adhesive generally used has melting points in the range of 80° C. to 105° C. and unfortunately, the seal integrity of the cells is subject to failure at high temperatures.

It is an object of the present invention to provide a method for assembling a solid electrolyte cell within a ceramic frame in which the ceramic frame functions as a housing for the cell components and said frame is soldered to a conductive terminal sheet on each of its top and bottom surfaces.

It is another object of the present invention to provide a method for assembling a solid electrolyte cell within a ceramic frame, said cell employing a solid electrolyte film containing poly(ethylene oxide) or a poly(ethylene oxide) type polymer in conjunction with ethylene carbonate and propylene carbonate.

It is another object of the present invention to provide a solder sealed solid electrolyte cell.

The foregoing and additional objects will become more fully apparent from the following description and drawings.

SUMMARY OF THE INVENTION

The invention relates to a method for producing a solid electrolyte cell assembled within a ceramic housing comprising the steps:

(a) preparing a first conductive terminal sheet and a second conductive terminal sheet and depositing on the peripheral area on one side of each first and second conductive terminal sheets a layer of a metal alloy solder;

(b) forming a ceramic frame defining an opening at the center and having a top surface and a bottom surface;

(c) depositing and securing at least one layer of a first metal-containing alloy on the top surface and bottom surface of the frame and then depositing at least one layer of a second metal-containing alloy solder onto the first metal-containing alloy layer on the top surface and onto the first metal-containing alloy layer on the bottom surface;

(d) preparing an anode, a solid electrolyte separator and a cathode, and with the frame positioned on the first conductive terminal sheet, said anode, said solid electrolyte separator and said cathode are assembled into the opening in the frame and closing the opening in the frame with the second conductive terminal sheet such that the metal-containing alloy solder layer on the first conductive terminal sheet is superimposed onto the layer of the metal alloy solder on the bottom surface of the frame and the metal alloy solder layer of the second conductive terminal sheet is superimposed onto the layer of the metal alloy solder on the top surface of the frame with said first conductive terminal sheet being secured to the bottom surface of the frame by soldering and said second conductive terminal sheet being secured to the top surface of the frame by soldering and wherein said anode is in electrical contact with one conductive terminal sheet and said cathode is in electrical contact with the other conductive terminal sheet. Preferably, the anode will be in pressure contact with one conductive terminal sheet and the cathode will be in pressure contact with the other conductive terminal sheet. The invention also relates to the cell so produced.

The first and second conductive terminal sheets may be made of any conductive material suitable for functioning as a terminal for the cell and capable of being soldered at the peripheral area of one side to another solderable surface. Examples of suitable conductive materials are copper, zinc, nickel, stainless steel, and nickel plated copper. The preferred material for use as the conductive terminal sheet is copper. A copper sheet can be coated on its peripheral surface with a layer of a metal alloy solder such as a tin/lead, copper/indium, lead/indium, tin/indium, tin/silver, and tin/bismuth. The thickness of the layer should be sufficient to provide a good solderable surface and will depend on the material of the conductive sheets. Generally a layer between 0.5 mil to 10 mils would be sufficient for most applications, with a layer between 1 mil and 5 mils being preferred and a layer between 1.5 mils and 3 mils being most preferred. A suitable metal alloy solder would be 60/40 tin/lead solder. The metal alloy solder can be deposited using any conventional techniques such as electroplating.

A ceramic frame is prepared with an opening at its center. The width of the top and bottom surface of the frame should be substantially equal to the width of the solder layer deposited on the conductive terminal sheets. This is preferred so that when a first conductive terminal sheet is placed on the top surface of the frame and a second conductive terminal sheet is placed on the bottom surface of the frame, the interior area of both conductive terminal sheets will not contain any exposed layer of the metal alloy solder. This will prevent any contact between the active cell components and the metal alloy solder layer since any such contact could increase the internal cell resistance which in turn would cause a voltage drop in the cell and/or cause an internal corrosion couple. Examples of a ceramic frame suitable for use in this invention could be selected from the group consisting of alumina, BeO, SiC, AlN, $Si_3N_4$, $SiO_2$, glass, and mixtures or composites thereof. The preferred ceramic would be an alumina-containing ceramic. The thickness of the ceramic frame should be selected so that when the cell components are placed within the ceramic frame, the cell-components will completely fill the frame and extend at least to the surface of the frame or beyond. This will insure good electronic contact between the cell components and the conductive terminals secured to the frame.

The preferred alumina-containing alloys for the ceramic frame would comprise 92% to 99% by weight alumina with 93% to 96% weight alumina being the most preferred. The top surface and bottom surface of the frame should be coated with a metal or metal alloy to provide a physical bond with the ceramic material while also providing a surface onto which a metal alloy solder can be deposited. Suitable metal coating for the frame would be copper, gold, silver, and platinum. Suitable metal alloys would be a moly-Mg alloy. The preferred initial coating on the frame is moly-Mg and this coating can be sintered onto the top and bottom surface of the frame. Generally, the metal or metal alloy could be pasted or plated onto the frame surfaces. The primary purpose of the initial coating on the surfaces of the frame is to provide a good physical ceramic to metal bond. On top of the initial metal or metal alloy coating is deposited a metal alloy solder which could be selected from the materials recited above for the conductive terminal sheets. The preferred metal alloy solder would be a low impurity solder such as a 90/10 tin/lead solder which could be electroplated over the initial coating. The thickness of the undercoat or initial coating will depend on the material and surface roughness of the ceramic frame and could be between about 0.5 mil to 3 mils, preferably between about 1.0 mil to 2.0 mils, and most preferably between about 1.0 mil to 1.5 mils. The thickness of the metal alloy solder can be between about 0.5 mil to 3 mils for most applications, preferably between about 1 mil to 2.5 mils, and most preferably between about 1.5 mils to 2.0 mils. The coatings should only be applied to the top and bottom surfaces of the frame that will mate with or contact the metal alloy solder coated areas of the conductive terminals so as to prevent shorting between the terminals of the cell. Thus the interior wall of the frame should not be coated.

The opening in and the thickness of the ceramic frame will depend on the volume of the components of the cell that will be assembled within the frame. As discussed above, the components of the cell shall at least fill the opening in the frame so that when a conductive terminal is positioned on each side of the frame, each conductive terminal will electrically contact a component of the cell. Preferably the component of the cell should be a pressure contact with the conductive terminal. The configuration of the frame could be square, rectangular, circle or any polygonal shape configuration such as a square frame having an extended tab which could be used as an indexing means. The tab could be an integral part of the unit or a separate part secured to the frame. Preferably, the size of the terminal sheets should be the same as the size of the frame so that when the terminal sheets are placed over the top and bottom surfaces of the frame, they will all be aligned. Thus the size of the opening and the thickness of the frame will be a primary factor in determining the cell's output capacity. In some applications one of the sheets may have an extended tab that could be folded over the other sheet and insulated from the other sheet so that both terminals of the cell could be on the same side. Alternatively, one sheet may be slightly smaller in size than the frame at a selected area so that a through hole could be placed in the uncovered portion of the frame and extend to the sheet on the opposite side. A conductive material, such as copper, conductive epoxy or a conductive eyelet, could be disposed in the opening of the ceramic so that it could make electrical contact with conductive sheets secured over one side of the frame and extend above the surface of the opposite side of the frame so that both terminals could be on the same side of the cell.

The conductive terminal sheet can be soldered to the frame using conventional soldering techniques. For example, a first conductive terminal sheet could be placed over the bottom surface of the frame and then a heated platen could be applied at a temperature from 250° C. to 350° C. under a pressure of 100 to 1200 psig for a time period to effect a good solder seal between the frame and the terminal sheet. Usually a time period of from 3 to 25 seconds would be sufficient. The cell components could then be placed within the frame and the second conductive terminal could be placed over the top surface of the frame. The second conductive terminal could be solder sealed to the frame as described above. Since the active components of the cell will be assembled in the frame when soldering the second conductive terminal to the frame, it is recommended that the first conductive terminal be kept cool. For example, liquid nitrogen could be used to cool the block holding the cell so as to prevent any excessive heating of the cell components. This is particularly important when the anode is a lithium metal anode. Also when one electrode is a material that swells or degrades at a relatively low temperature, e.g. 300° C. or less, then in such a case it is preferred to place the electrode in contact with the first coated terminal while the seal to the second terminal is being made.

Although many solid electrolytes can be used in this invention, the preferred solid electrolyte separator is one fabricated from a composition of poly(ethylene oxide), referred to hereinafter as PEO, along with a lithium salt, the anion of which may, for example, be I, Br, $ClO_4$, SCN, $BF_4$, $PF_6$ or $CF_3SO_3$. Added to this composition is ethylene carbonate and propylene carbonate. It has been found that ethylene carbonate is better than propylene carbonate as an electrolyte solvent because it has a higher electric constant, but has the disadvantage, for use in a liquid system, that it is solid at room temperature. Thus, for solid electrolyte applications, ethylene carbonate would be the desired choice. However, it was discovered in copending application Ser. No. 421,085 filed Oct. 13, 1989 that the addition of propylene carbonate along with ethylene carbonate to a poly(ethylene oxide)-containing solid electrolyte will effectively lower the temperature at which the polymer undergoes a transition from an amorphous form to a crystalline form thereby substantially eliminating the presence of a crystalline form of the polymer at temperatures above about 20° C. This composition of a solid electrolyte is excellent for use in a solid electrolyte cell that can function at temperatures of about 20° C. and above.

The preferred polymeric solid electrolyte film for use in this invention functions as a physical barrier between the anode and the cathode material, as well as, being ionically conductive at temperatures of 20° C. The preferred composition of the solid electrolyte separator would be PEO-70wt/% $(3EC-1PC)_{20}LiClO_4$. The preferred preparation of the polymeric solid electrolyte would be as follows:

A desired quantity of ethylene carbonate is dissolved with propylene carbonate in a small beaker. The beaker is covered and set aside until the ethylene carbonate is dissolved completely. The beaker may be heated slightly (50° C.) to expedite the process. Dried poly(ethylene oxide) is combined in a high density polyethylene bottle containing ¾ inch diameter ceramic mixing balls with isopropyl alcohol. The solution along with a metal salt, ethylene carbonate, propylene carbonate, and a solvent can then be ball milled for a time period such as 30–45 minutes until a smooth viscous mixture is formed. The mixture can then be set aside for degasing.

The polymeric electrolyte solution can then be cast onto a release paper such as a polyethylene or silicone coated release paper. The film is then allowed to dry for example about 2 hours. The film can then be transferred into a controlled temperature and humidity atmosphere (dry room) to complete the drying cycle. The material should have a moisture content less than about 30, preferably less than about 20 ppm $H_2O$ for battery use. Higher moisture levels result in a tacky film with poor mechanical properties. In addition, a latent reaction between the water and the salt (for example $LiClO_4$), the water and the lithium and/or the water and the solvent may also occur in a sealed cell if the water content is too high.

The molecular weight of the PEO can vary from 600,000 to 5,000,000. The proportions of the EC to PC could vary between 3.4 to 0.5 and 0.5 to 3.5. The amount of the PEO component of the solid electrolyte could vary from 30 to 50 weight percent. Suitable solvents for use in preparing the solid electrolyte could be acetonitrile, methanol, tetrahydrofuran (THF), isopropyl alcohol, dichloromethane and the like.

The cathode material for use in this invention can contain an active cathode material such as manganese dioxide ($MnO_2$), carbon monofluoride, vanadium pentoxide, metal chromate such as silver chromate and silver bismuth chromate and silver vanadium chromate; metal oxide such as nickel oxide, lead oxide, bismuth lead oxide and copper oxides; sulfides such as copper sulfides and iron sulfides; and cadmium. A carbonaceous material, if used, should preferably be carbon. The preferred carbonaceous material is acetylene or furnace black. The cathode material should also contain the same material as the electrolyte such as poly(ethylene oxide) with a lithium salt, the anion of which may, for example, be I—, Br—, $ClO_4$, —SCN, $BF_4$, —$PF_6$— or $CF_3SO_3$, —along with ethylene carbonate and propylene carbonate. The solvent for the cathode could be methanol, trichloroethylene and the like. The preferred preparation of the cathode material would be the following:

A quantity of ethylene carbonate can be dissolved with propylene carbonate in a small beaker. The container could then be covered and set aside until the ethylene carbonate is completely dissolved. The beaker may be heated slightly (50° C.) to expedite the process. Pre-treated manganese dioxide and carbon could be mixed in their dry states in a high density polyethylene bottle with ¾ inch diameter ceramic mixing balls for one hour. Upon completion of the dry blend, a solvent such as methanol can be added. The mix can then be milled for about 1 hour. A second quantity of a solvent such as methanol and dried poly(ethylene oxide) can then be added slowly, alternating between small additions of liquid and dry materials, shaking vigorously between each combination. Next a salt such as a $LiClO_4$ salt can be added and the composition shaken once again. Finally, a second solvent, such as trichloroethylene, the dissolved EC/PC solution and a dispersant such as sorbitan monooleate, can be blended into the previous manganese dioxide-containing mixture and then can be milled for one hour. The composite can then be degassed and cast onto a coated release paper substrate such as polyethylene. The film can be allowed to dry for about 2 hours. The film can be transferred in a controlled temperature and humidity atmosphere (dry room) to complete the drying cycle. The material should have a moisture content less than about 30, preferably less than about 20 ppm $H_2O$ for cell use. Higher moisture levels result in a tacky film with poor mechanical properties. In addition, a latent reaction between the water and $LiClO_4$, the water and the lithium and/or the water and the solvent may also occur in a sealed cell if the water content is too high.

Additional EC and PC may be added to the cathode material prior to its assembly into a cell to replace any of the EC/PC that may have been lost during the drying step. Also additional EC/PC should be added to facilitate the proper contact with the conductive terminal since EC/PC will make the cathode material somewhat tacky.

The conductive terminal sheet for use in this invention could be copper, nickel, stainless steel or the like, with copper being the preferred current collector and more preferably the copper could be surface treated to enhance its affinity for adhesion to metal alloy solder. For example, the copper could be electrodeposited so that the surface would be roughened. Preferably the thickness of the conductive terminal for most applications could be from 0.0005 to 0.003 inch thick.

The anodes for use in this invention are lithium, lithium alloys, calcium, sodium and potassium with lithium and lithium alloys being the preferred.

The solid electrolyte cell may be encapsulated in various laminates to provide additional protection for the cell. However, if the cell is encapsulated in a film such as a polyamide, mylar or metalized polyethylene film, then provisions should be made so that electrical contact can be made from outside the cell to the conductive terminals of the cell. This could be accomplished by providing an opening in the film thereby exposing a selected area of each of the conductive terminals.

As stated above, the cell of this invention can be encased or encapsulated between layers of a plastic material in which the cell becomes embedded within said material as an integral part of material. Generally, this encapsulation involves a combination of high pressure at elevated temperature of as high as 200° C. The alumina-containing ceramic housing of this invention is capable of withstanding flexural pressures up to 50,000 psi, preferably at least 25,000 psi; compressive strength of 130,000 psi or higher, preferably 300,000 psi; tensile strength of 15,000 psi or higher, preferably 25,000 psi and withstand a temperature of 1300° C., preferably, 1700° C. For example, the cell of this invention could be encapsulated in a printed circuit board so that the printed circuit board along with other electronic components could provide a self-contained power electronic device.

The present invention will become more apparent from the following description thereof when considered therein with the accompanying drawings which are set forth as being exemplary of an embodiment of the present invention and are not intended in any way to be limitative thereof.

DETAILED DESCRIPTION OF THE DRAWINGS

Figure 1:
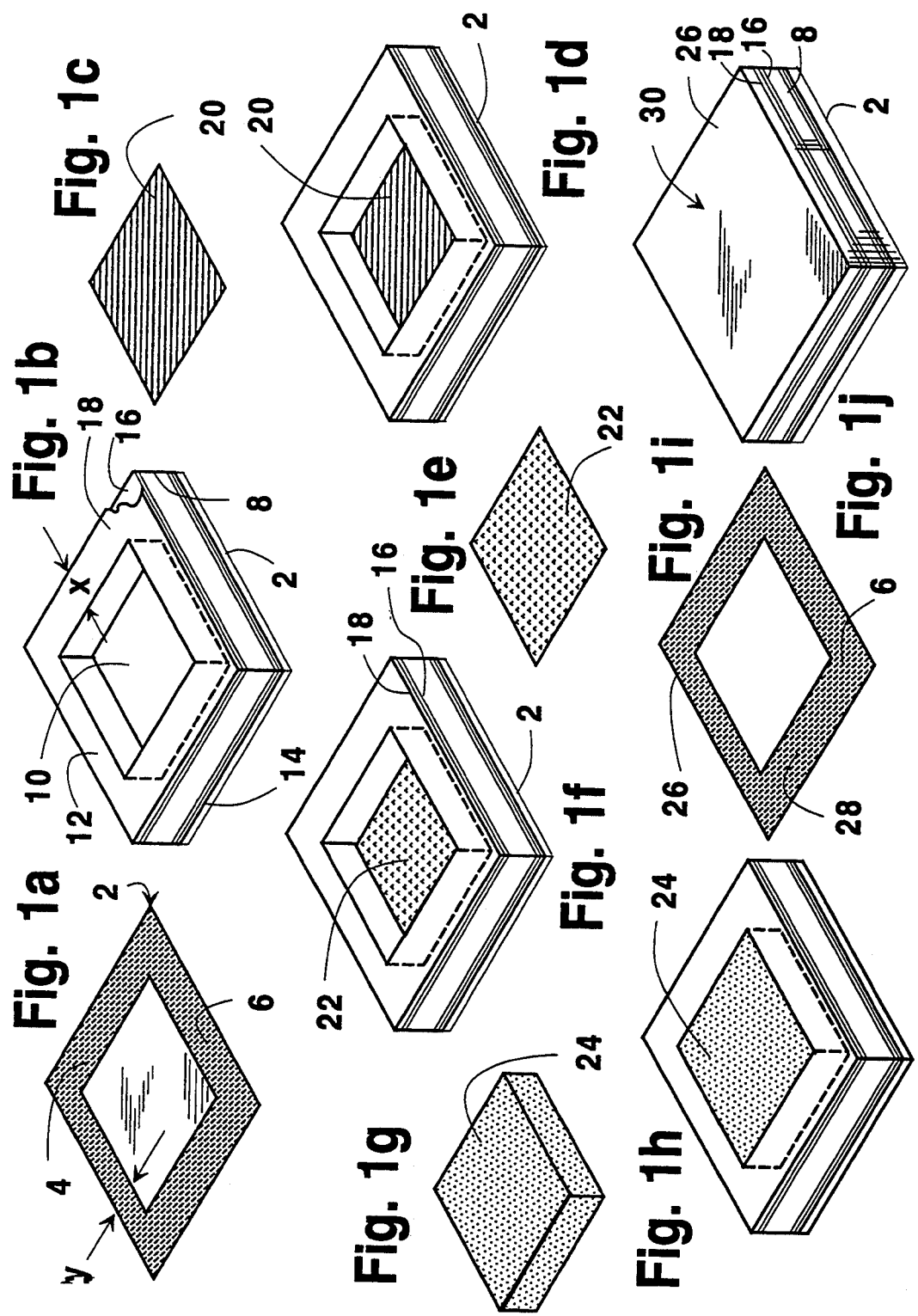
FIG. 1a is perspective view of a copper sheet (terminal) having a metalized layer at the peripheral area on the top side of the sheet.
FIG. 1b is a perspective view of a ceramic frame defining an opening at its center and in which the copper sheet of FIG. 1a is secured to the bottom side of the ceramic frame.
FIG. 1c is a perspective view of an anode sheet for use in the cell of this invention.
FIG. 1d is a perspective view of the ceramic frame of FIG. 1b in which the anode sheet of FIG. 1c is shown disposed in the opening of the ceramic frame to make contact with the copper sheet.
FIG. 1e is a perspective view of a separator for use in the cell of this invention.
FIG. 1f is a perspective view of the ceramic frame of FIG. 1d in which the separator of FIG. 1e is shown disposed in the opening of the ceramic frame to make contact with the anode.
FIG. 1g is a perspective view of a cathode for use in the cell of this invention
FIG. 1h is a perspective view of the ceramic frame of FIG. 1f in which the cathode of FIG. 1g is shown disposed in the opening of the ceramic frame making contact with the separator.
FIG. 1i is a perspective view of a copper sheet (terminal) having a metalized layer at the peripheral area on the underside of the sheet.
FIG. 1j is a perspective view of the ceramic frame of FIG. 1h in which the copper sheet is secured to the top surface of the ceramic frame making contact with the cathode and producing an assembled cell.

FIGS. 1a to 1j show a first conductive terminal sheet 2, preferably copper, onto which is coated on one side of terminal sheet 2 at its peripheral area 4 a metal alloy solder 6. Preferably the metal alloy solder would be a tin/lead solder (most preferably 90/10 tin/lead solder) deposited by electroplating to a preferred thickness of from 1 to 1.5 mils. A ceramic frame 8 having a central opening 10 has a perimeter equal to the perimeter of terminal sheet 2 so that when sheet 2 is superimposed on frame 8 they are completely aligned. The top surface 12 and the bottom surface 14 of ceramic frame 8 are given a first coating of a metal or metal alloy 16 to form a bond between the coating 16 and the ceramic frame 8. A second coating of a metal alloy solder 18 is deposited on top of coating 16. The width X of frame 8 is the same as the width Y of sheet 2 so that when frame 8 is placed on sheet 2, the uncovered inner surface of sheet 2 will be free of any metal alloy solder. With frame 8 aligned onto sheet 2, sheet 2 is soldered to frame 8 using an appropriate temperature, pressure and time period. Thereafter an anode 20 (FIG. 1c), preferably lithium, sized slightly smaller than the opening 10 in frame 8 is placed in frame 8 and electrically contacts the surface of sheet 2 as shown in FIG. 1d. If desired, a ram or ultrasonic means could be used to apply pressure to secure contact of the anode 20 to sheet 2. A solid electrolyte separator 22 (FIG. 1e), preferably a PEO separator, is placed within opening 10 of frame 8 over anode 20 as shown in FIG. 1f. Preferably the separator 22 would be slightly larger than opening 10 so that the excess will form a cup-like shape when pressed on top of anode 20 and thereby provide an additional protection against internal shorting along the edges.

Next a suitable cathode composite 24 sized equal with opening 10 in frame 8 is pressed into opening 6 shown in FIG. 1h. As stated above, it is important that the thickness of anode 20, separator 22 and cathode 24 is sufficient to completely fill the depth of opening 10 in frame 8 in order to insure good contact with the conductive terminal sheets. After assembly of the cathode 24, a second conductive terminal sheet 26, identical to sheet 2 and also having a metal alloy solder layer 28, is placed over frame 8 and sealed to frame 8 in a manner as described above for sheet 2. An assembled cell 30 is now produced as shown in FIG. 1j. Since the active components of the cell are assembled in frame 8, it is suggested that sheet 2 be cooled during the soldering of sheet 26 to frame 8 to prevent any excessive heating of the cell components, especially when lithium is used as the anode. For example, liquid nitrogen may be used to cool a block contacting sheet 2 which in turn contacts anode 20 during the soldering of sheet 26 to frame 8. Using the method of this invention, a cell can be produced having any desired capacity depending on the volume of the opening in the frame. The cell so produced will be a rigid cell capable of functioning at high temperatures and therefore ideally suited for being encapsulated or molded into various devices, boards, or electronic housings.

Figure 2:
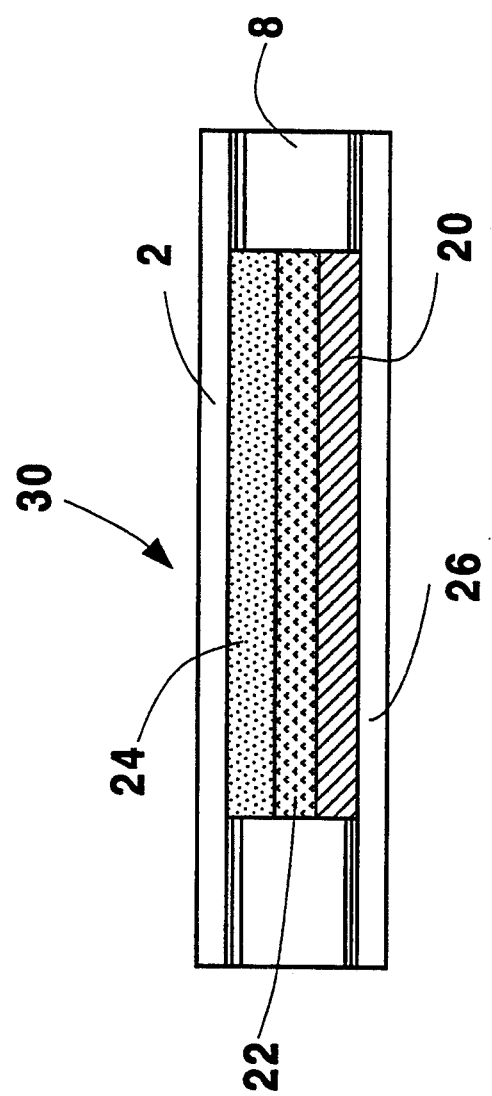
FIG. 2 is a cross-sectional view of a solid electrolyte planar cell produced using the method of this invention and as described in conjunction with FIGS. 1a to 1j.

FIG. 2 shows a cross-sectional view of the solid electrolyte cell 30 produced as described in conjunction with FIGS. 1a to 1j and has identical components identified with the same reference numbers. Specifically, FIG. 2 shows a solid electrolyte cell 30 comprising a cathode material 24, solid electrolyte separator 22 and anode 20 disposed within opening 10 of frame 8. Anode 20 is in pressure and electrical contact with conductive terminal sheet 26-which in turn is secured by solder means to frame 8. Cathode 24 is shown in pressure and electrical contact with conductive terminal sheet 2 which in turn is secured by solder means to frame 8.

Figure 3:
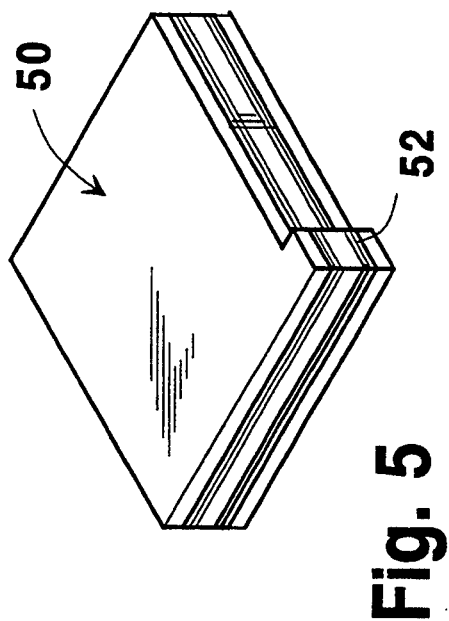
FIG. 3 is a perspective view of an assembled cell of this invention in which the bottom copper terminal has an extended tab folded onto and insulated from the top copper terminal so that both terminals of the cell are on the top side.

FIG. 3 shows an assembled cell 31 in which the bottom conductive terminal 32 has an extended tab 34 which extends over and onto top conductive terminal 36. An insulating material 38 is placed between terminal 36 and tab 34 so that both terminals 36 and 32 are on the top side of the cell.

Figure 4:
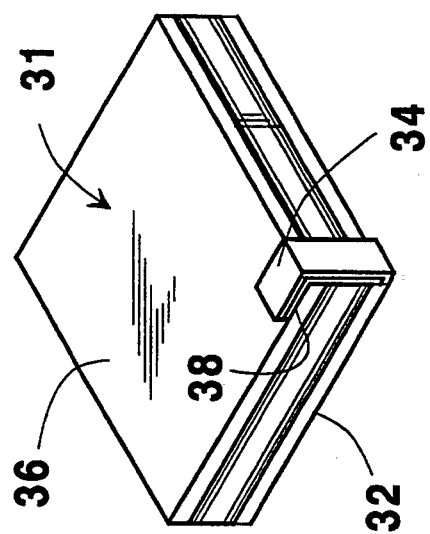
FIG. 4 is a perspective view of an assembled cell of this invention in which one end of the cell is cut off.

FIG. 4 shows an assembled cell 40 in which the end 42 is removed to provide a polarization key for the cell.

Figure 5:
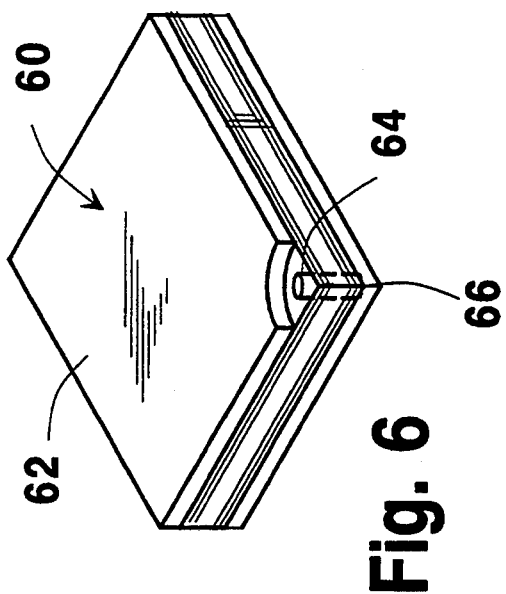
FIG. 5 is a perspective view of an assembled cell of this invention in which a square ceramic frame has an extended protrusion on one of its sides.

FIG. 5 shows an assembled square cell 50 in which one side has an extended protrusion 52 which is adapted to sit within a similar cavity in a battery powered device.

Figure 6:
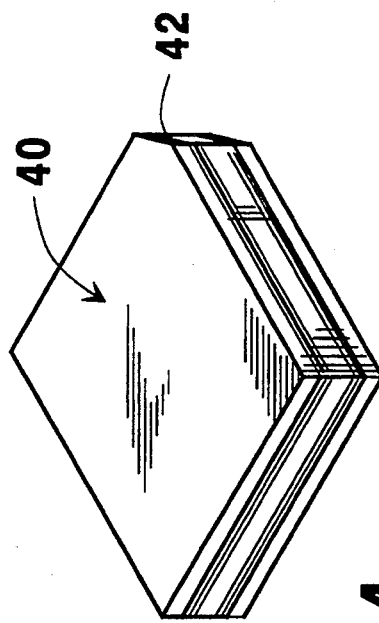
FIG. 6 is a perspective view of an assembled cell of this invention in which the top terminal sheet exposes a selected area of the ceramic frame so that a through hole placed in the ceramic frame contains a conductive material that makes electrical contact with the bottom terminal sheet and extends above the top surface of the ceramic frame so that both terminals of the cell are on the top side.

FIG. 6 shows an assembled cell 60 in which a portion of the top conductive terminal 62 is removed exposing a conductive lined or filled through opening 64 which makes electric contact with conductive terminal 66. Thus, both terminal 60 and terminal 66 are on the top surface of the cell 60.

The overall assembled cell produced can be used to operate any electrical device designed to operate at the cell's output potential. Although not shown, the cell could be encased in an enclosure such as a plastic enclosure having appropriate openings so that electrical contact could be made to both current collectors. The flat cell so produced occupies only a relatively small space and therefore can accommodate a variety of small battery operated devices. The cell can be fabricated with various output capacities and sizes to accommodate various electrical devices.

EXAMPLE

A sample cell was made using the procedure as described in FIGS. 1a to 1j. The cathode material was made from a composition as follows:

| | |
|---|---|
| 40.0 | grams of heat treated manganese dioxide |
| 2.28 | grams of heat treated carbon |
| 23.36 | grams of ethylene carbonate dissolved with 9.04 grams of propylene carbonate |
| 4.0 | grams of $LiClO_4$ salt |
| 15.56 | grams of poly(ethylene oxide) (PEO) |
| 240 | ml of methanol |
| 320 | ml of trichloroethylene |
| 24 | grams of SPAN 80 which is a trademark for sorbitan monooleate of ICI, Atlas Chemical Division of United States |

A thin piece of a solid electrolyte (separator) was produced having the following composition:

| | |
|---|---|
| 21.60 | grams of a complex of poly(ethylene oxide) |
| 5.16 | grams of a lithium salt, $LiClO_4$ |
| 37.80 | grams of ethylene carbonate |
| 12.60 | grams of propylene carbonate |
| 75 | ml of isopropyl alcohol |
| 460 | ml of acetonitrile |

A 6 mils thick piece of lithium was used as the anode.

The cell was assembled as described with reference to FIGS. 1a to 1j. The conductive terminal sheets were copper and coated on their peripheral surface with a 90/10 tin/lead solder. The frame was 96% alumina and was given a first layer of a Moly-Mg-Ni alloy about 1.5 mils thick applied by sintering. A second layer of a 90/10 tin/lead solder, about 1.5 mils thick was plated over the first layer. Both conductive terminal sheets were soldered to the frame using a heated platen applied at a temperature of 350° C., pressure of 30 psig for 6 seconds. When soldering the second conductive terminal sheet to the frame containing the cell components, liquid nitrogen was used to contact the block holding the anode terminal so as to prevent any excessive heating of the lithium anode. The open current voltage was 3.44 volts. The closed circuit voltage was 3.43 volts.

It is to be understood that modifications and changes to the preferred embodiment of the invention herein described can be made without departing from the spirit and scope of the invention. For example, bipolar batteries could be constructed to produce higher voltages. For example, in FIG. 2 if two batteries were placed on top of each other with one of the conductive terminals (current collectors) removed, then a bipolar battery would be constructed consisting of a conductive terminal 2, anode 20, separator 22, cathode 24, another conductive terminal 2, if desired, another anode 20, another separator 22, another cathode 24 and a final conductive terminal 26.

What is claimed:

1. A cell comprising a ceramic frame defining an opening and having a top surface and a bottom surface; a first conductive terminal sheet solder secured to and closing the bottom surface of the frame; a second conductive terminal sheet solder secured to and closing the top surface of the frame; and an anode, an electrolyte and cathode assembly within the opening of the frame and arranged so that the anode makes electrical contact with one conductive terminal sheet and the cathode makes electrical contact with the other conductive terminal sheet.

2. The cell of claim 1 wherein the anode is lithium, and the cathode is $MnO_2$.

3. The cell of claim 1 wherein the first conductive terminal sheet and second conductive terminal sheet are copper.

4. The cell of claim 1 wherein one of the conductive terminal sheets has an extended tab that extends over and onto the other conductive terminal sheet and said tab is insulated from the other conductive terminal sheet so that both terminals are on the same side of the cell.

* * * * *